(12) United States Patent
Waldron et al.

(10) Patent No.: US 6,925,179 B2
(45) Date of Patent: Aug. 2, 2005

(54) METHOD AND APPARATUS FOR A HEARING AID COUPLING SYSTEM

(75) Inventors: Joan Phillips Waldron, Fort Collins, CO (US); Grace M. Scire', Danbury, CT (US); Jacob Segovia, Divide, CO (US)

(73) Assignee: New World Sounds, Inc., Danbury, CT (US)

( * ) Notice: Subject to any disclaimer, the term of this patent is extended or adjusted under 35 U.S.C. 154(b) by 561 days.

(21) Appl. No.: 09/821,097

(22) Filed: Mar. 29, 2001

(65) Prior Publication Data

US 2001/0055386 A1 Dec. 27, 2001

(Under 37 CFR 1.47)

Related U.S. Application Data

(60) Provisional application No. 60/195,240, filed on Apr. 7, 2000.

(51) Int. Cl.[7] .......................... H04M 1/00; H04M 11/00
(52) U.S. Cl. ........................................ 379/443; 379/52
(58) Field of Search .......................... 379/52, 443, 444; 381/312, 326, 330, 331; 455/575.2

(56) References Cited

U.S. PATENT DOCUMENTS

| | | | |
|---|---|---|---|
| 2,048,604 A | 7/1936 | Finch | 179/2 |
| 2,554,834 A | 5/1951 | Lavery | 179/107 |
| 2,837,607 A | 6/1958 | McGee | 179/107 |
| 3,396,245 A | 8/1968 | Flygstad | 179/107 |
| 3,668,334 A | 6/1972 | Schwake | 179/107 |
| 3,742,359 A | 6/1973 | Behymer | 325/26 |
| 3,862,378 A | 1/1975 | Norris | 179/156 |
| 4,137,431 A | 1/1979 | Pallesen | 179/107 |
| 4,160,122 A | 7/1979 | Jacobson | 179/1 |
| 4,403,120 A | 9/1983 | Yoshimi | 179/182 |
| 4,420,657 A | 12/1983 | Larkin | 179/156 A |
| 4,539,439 A | 9/1985 | Strothmann et al. | 179/107 |
| 4,543,453 A | 9/1985 | Brander | 179/107 R |
| 4,697,283 A * | 9/1987 | Lafrance et al. | 379/443 |
| 4,701,958 A | 10/1987 | Neth | 381/68 |
| 4,723,293 A | 2/1988 | Harless | 381/68 |
| 4,930,156 A | 5/1990 | Norris | 379/388 |
| 5,010,575 A | 4/1991 | Marutake et al. | 381/68 |
| 5,058,155 A | 10/1991 | Larsen | 379/442 |
| 5,086,464 A | 2/1992 | Groppe | 379/430 |
| 5,091,952 A | 2/1992 | Williamson et al. | 381/68.2 |
| 5,590,417 A * | 12/1996 | Rydbeck | 455/575.2 |
| 5,615,229 A | 3/1997 | Sharma et al. | 375/259 |
| 5,740,257 A | 4/1998 | Marcus | 381/71.6 |
| 5,796,821 A | 8/1998 | Crouch et al. | 379/430 |
| 6,122,500 A | 9/2000 | Dent et al. | 455/414 |
| 6,438,245 B1 * | 8/2002 | Taenzer et al. | 381/330 |

FOREIGN PATENT DOCUMENTS

| | | | |
|---|---|---|---|
| EP | 565181 | 10/1993 | |
| JP | 58-31647 | 2/1983 | |
| JP | 363102495 A * | 5/1988 | 379/52 |

* cited by examiner

Primary Examiner—Jack Chiang
(74) Attorney, Agent, or Firm—Richard W. Hanes; Hanes & Schutz, P.C.

(57) ABSTRACT

An audio coupler device for communication with a T-coil in a hearing aid is described to fit inside the receiver section of a handset as defined. The coupler device is so mounted inside the receiver section as to provide strong inductive coupling with a T-coil inside the hearing aid to deliver audio signals from the handset to the person wearing the hearing aid. The coupler device has a coil and a magnetic core that is preferably formed of a ferromagnetic material and a capacitor is placed in series with the coil. The coupler device in turn is connected in series with the speaker so as to reduce loading of circuitry inside the handset and driving the speaker. The coupler device can be mounted in many different handset devices and is preferably mounted to concentrate an audio inductive field at the T-coil in a hearing aid worn by a person using the handset device.

10 Claims, 8 Drawing Sheets

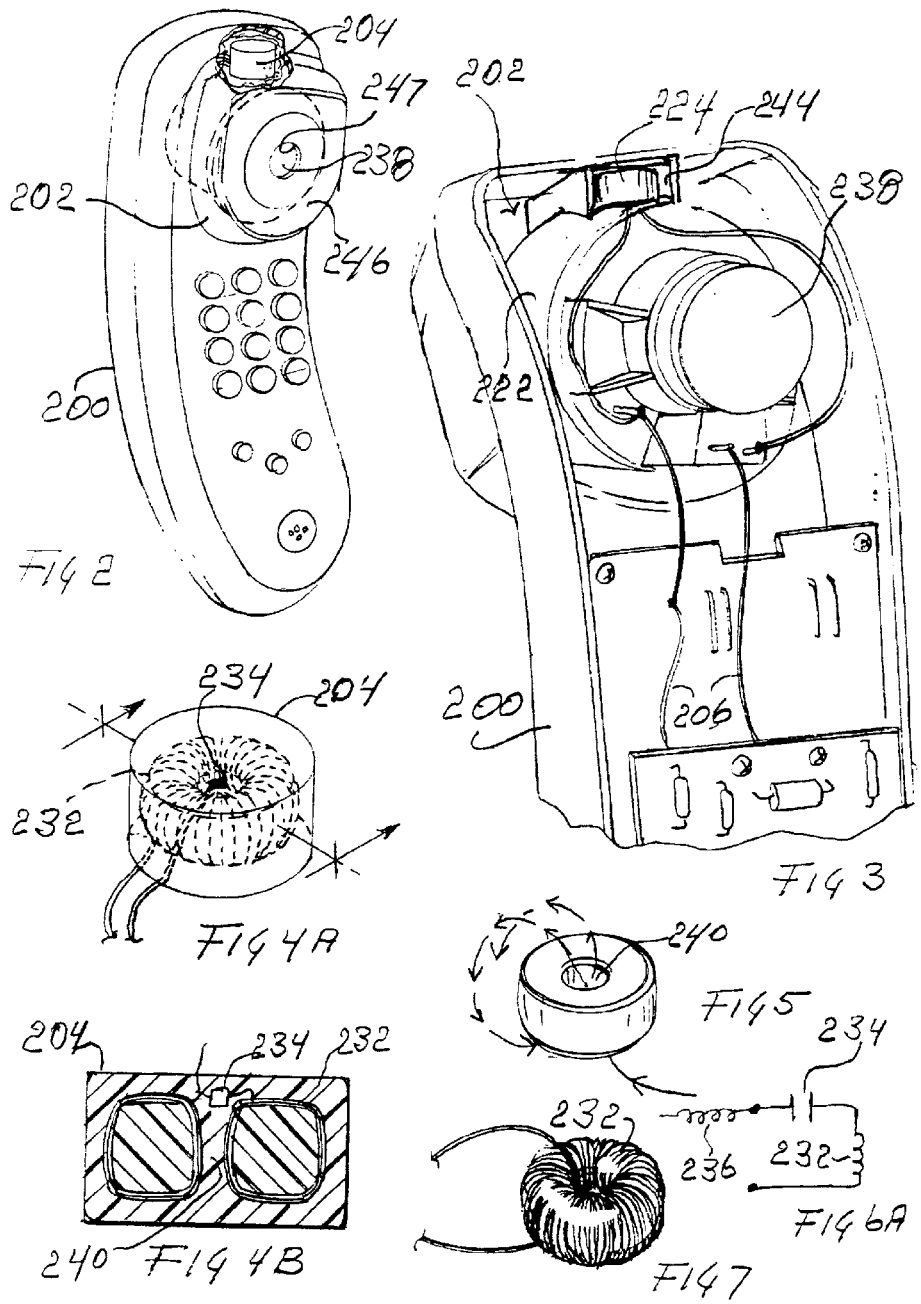

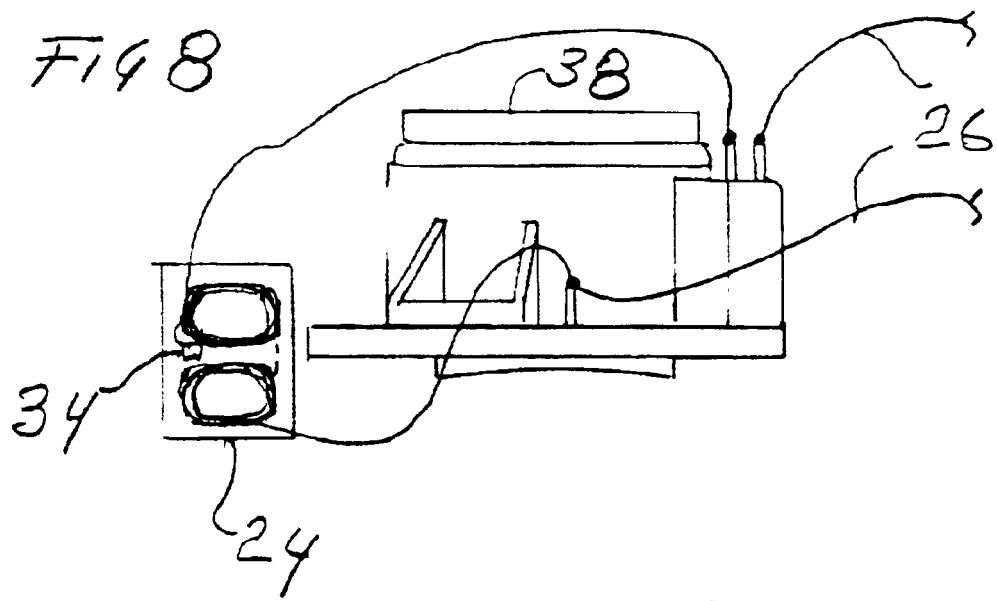
FIG 8
FIG 6B
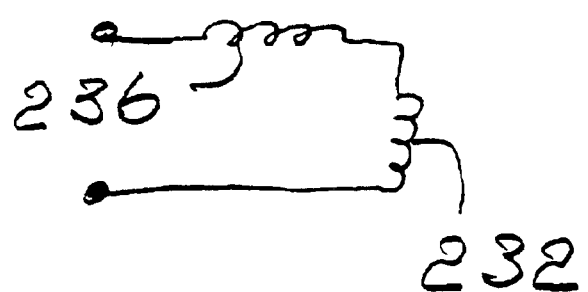

MAGNETIC LINES OF FLUX

ROUND WIRE

RECTANGULAR WIRE

METHOD AND APPARATUS FOR A HEARING AID COUPLING SYSTEM

PRIOR APPLICATION

This application is continuation in part of U.S. Provisional Patent Application No. 60/195,240 filed Apr. 7, 2000 and entitled Method And Apparatus For Hearing Aid Coupling System.

FIELD OF THE INVENTION

This invention generally relates to an improved hearing aid compatible telephone and more specifically to an improved coil for use in transferring sounds from a telephone to a hearing aid.

BACKGROUND OF THE INVENTION

In U.S. Pat. No. 5,796,821 to Crouch et al, a hearing aid telephone interconnection system is described to enable hearing-impaired persons to use conventional telephone instruments. The system employs a T-coupler that is formed of an elongate coil of some 360 turns of 40-gauge magnet wire. The T-coupler has an arcuate shape that corresponds generally to a user's ear and of a conventional behind-the-ear hearing aid so that the body portion of the T-coupler can inductively couple audio signals into a T-coil of the hearing aid. The T-coupler is connected through an adapter box to the telephone cable leading also to a hand set. The T-coupler connection is by way of an audio plug, which, when inserted, causes an interruption of signals to the handset speaker.

A variety of U.S. patents can be found in which different techniques are used to couple a telephone to a hearing aid. One such patent, U.S. Pat. No. 5,086,464, to Groppe, describes a complex head set to couple the telephone speaker sound to the ear. In U.S. Pat. No. 3,396,245 a device is employed to automatically switch signals between a hearing aid and a telephone in two modes of operation.

Many of the more that 60 million people with hearing disabilities in the U.S. alone are presently unable to use standard telephone instruments that are in common use by persons having normal hearing ability. It is estimated that there is a population of 600 million people with hearing disabilities worldwide with an accelerating 15% annual growth rate in the United States alone.

Hearing impaired people on the whole do not have access to technology for enabling access to, or the capability of using and hearing on a telephone. There is a lack anything on the market that can fully address all issues that the hearing impaired face when it comes to doing just one task, namely of allowing them to just pick up a telephone and hear on it. While there are many devices on the market that claim that they allow the hearing impaired to do just that, upon closer inspection definite drawbacks manifest themselves in prior art devices.

For the better part of 40 years, the most often used technique is to use a large open-air coil to transmit an audio signal, via electromagnetic induction. These coils are commonly large, bulky and cumbersome to use and wear. While they have different shapes and forms, they tend to be worn either around the neck or as a fixture that hangs on the ear and thus tends to look out of place.

A number of TTY products (telecommunication devices for the deaf) are available in the market place. These products are typically terminals that transmit typed messages over telephone lines to a compatible terminal or to relay operators at the receiving end of the line, These TTY terminals are disadvantageous in that they do not meet the full accessibility needs of hearing impaired persons. According to the Tele-Consumer Hotline, less than one-half million people with hearing loss utilize a TTY for telecommunications due to the desire for voice telecommunications. It should also be pointed out that this technology is over 50 years old.

Sound amplification products also exist in the prior art, but they clearly do not amplify or transmit to the extent required to truly benefit a hearing disabled person. The 18–30 decibels of amplification typically realized from these prior art products will not truly benefit a person suffering from even a moderate hearing loss, let alone one who is severely to profoundly deaf.

Use of standard telephones with a volume control, a dual volume control, hearing aid compatible handsets, hearing aid telephone interconnect systems, and other products, address access for less than about 10% worldwide, for those that have a mild to moderate hearing loss. These products fail to meet the true needs of the population who need hearing access to telephones.

Existing hearing aid compatible or interconnect systems tend not to provide the power or the signal strength capture capability needed to directly couple to the hearing aid to ensure maximum telephone hearing access as is needed by millions of hearing aid users today. Either a person with a hearing disability cannot hear any sounds upon using one of these devices or they can hear something, but are having difficulties understanding the words being spoken on the phone. Some who have tried to use these types of devices tend to encounter what is known as "dead spots" i.e. when no sound transmission occurs, usually because of an inability to maintain capture of the signal because they do not hear sufficiently through the device.

It has been demonstrated to the Federal Communications Commission, including its Department of Engineering, that the performances of hearing aid compatible phones, volume controls and dual volume control handsets are the same. In effect their performances yield results that are equivalent to a slight raise of the sound volume. Such performance is inadequate, whether one uses a hearing aid or not. A consequence of these devices is that people with more than a mild to moderate hearing loss will not use a hearing aid compatible phone because these persons have, on the whole, not been able to adequately hear at any level using these products.

The upshot of these inadequacies is that a majority of the world's hearing impaired population still cannot access voice telecommunications. They have been denied access, convenience, and in many instances the life saving benefits of both wired and wireless phone usage in homes, offices, hotels, airports, restaurants, hospitals, jobs, pay phones, and more. The general unavailability of emergency phone access is particularly harsh for hearing impaired persons.

The scope of this lack of access is particularly evident because in the U.S. alone about 120 million public telephones are in use today. All of the pay phones that are currently deemed as hearing aid compatible or have volume controls only allow those individuals with mild to moderate hearing loss or those without hearing impairment access to these phones. Thus excluding a large number of persons from access to these phones.

Traditionally it has been normal practice to take the audio signal present in the environment and electronically inject it into the hearing aid of a person. This serves to circumvent an inherent problem associated with the poor reproductions of the acoustic audio signals as these are received by the hearing aid. For nearly 30 years, manufacturers have relied upon a device, known as the induction coil, to bypass the acoustic reproduction. For whatever reasons, be it poor design, or cost reduction, many of these devices fall short of delivering a quality audio signal to the hearing aid T-coil. Certainly, a convenient and simplified use of an effective hearing aid compatible handset has not been made available.

Various deficiencies are associated with prior art telephone to hearing aid type couplers. For example, many prior art products require a user to ascertain that switches and controls are set in an exact manner to perform one particular aspect of operation. These same controls must then be set up in a different fashion to achieve a different function. The result is the user tends to become frustrated and confused by the complexity of operating the product. Often many of the prior art devices require an assortment of cables and cords to be installed in exact manner. The possibility of a user mis-wiring the product is high and the user may not be able to figure out how to hook the device up properly.

When a user needs to wear a piece of headgear as described in the U.S. patent to Groppe the user feels foolish and silly. Many users would tend to be too embarrassed to use the device in both public and private settings. When a hard plastic coupler is involved, as is often the case, the product is uncomfortable and tends to be painful for the user to wear for a long time.

Ineffective performance is a particularly onerous deficiency in many of the prior art devices for enhancing telephone communication by hearing-impaired persons. These devices tend to under perform because of a variety of reasons such as a low sound pressure level, a lack of clarity, and the complexity imposed on the user to eliminate so-called "dead spots" in signal transmissions.

When a device as described in the aforementioned '821 patent is used, an air coil is employed. Such coil tends to waste available energy because it radiates the electromagnetic field in too many directions. As a result it is less efficient in coupling audio signals inductively to the hearing aid. An air coil also tends to have high impedance, typically of the order of about 90 to 120 ohms, and thus fails to create the desired electromagnetic field strength when driven by a typical semiconductor amplifier. This then imposes a greater battery load to properly power the air coil. An open air coil also tends to be large, typically in the range from 1" long by about ¾" wide.

FIGS. 14 and 15 depict the typical magnetic propagation of a prior invention as described in the aforementioned U.S. '821 patent. In this patent the magnetic lines of force tend to concentrate along the front, top, bottom and rear of the device. Very little magnetic lines of force 40 are devoted to going to the sides of the device 38.

SUMMARY OF THE INVENTION

With a hearing aid compatible device in accordance with the invention a typical handset can be used to create a direct communication path with the T-coil of the hearing aid. This enables a hearing-impaired person to then receive a clear audio signal from the receiver end of the handset and permit the person to carry on an effective conversation or listen to the playback of a recording.

This is achieved in accordance with one embodiment of the invention by placing a small inductor coil in series with the speaker of a handset and inside the receiver part of the handset in close proximity to the outer surface of the receiver to enhance inductive coupling of audio signals passing through the speaker to a hearing aid's T-coil.

With a hearing aid compatible device in accordance with the invention, the need for special batteries to power the device are avoided and the signal power available inside the standard device or the telephone can be used to drive the inductive coupling between the hearing aid and the device. No external switches, wires or cords are needed and no headgear, as proposed by some prior art approaches, is required.

With a small coupling coil in accordance with the invention located inside the handset housing, an effective communication is enabled with a hearing impaired person in a comfortable manner that can dramatically benefit millions of people with hearing loss. As a result the telephone can be an available mode of communication for the hearing impaired persons.

As further described herein for a preferred embodiment, a special coil is used inside the handset to enhance inductive coupling with a hearing aid adjacent to the receiver part of the phone or other device. The coil is provided with a ferro-magnetic core, which enables it to be made small enough to fit inside the receiver or phone-housing cavity where the speaker is also located.

As further described for one embodiment in accordance with the invention the coil can be connected in series with a capacitor and the series circuit placed in series with the speaker coil of the handset and thus in series with the wires conveying incoming audio signals to the speaker. The series circuit with the coil has low impedance, of the order of about 5 ohms, so that the load impact on the phone lines from the additional coupling circuit is very small.

Hence with a coupler device in accordance with the invention the large bulky coils of the prior art can be avoided where a small space only is available, superior electrical characteristics are obtained with an independently operated device without requiring controls and with excellent frequency response and useable in virtually any handset type device.

It is, therefore, an object of the invention to provide a handset device, which can include a telephone, with which hearing-impaired persons can clearly and conveniently communicate.

It is a further object of the invention to provide a standard telephone housing in which a device can be placed with which a direct inductive coupling of audio signals from the speaker part of the phone to the T-coil of a hearing aid is obtained to yield superior communication that is useable and clear for hearing impaired persons.

It is a further object of the invention to provide an improved hearing aid compatible phone in which an improved magnetic flux can be generated to enable direct communication with a hearing aid through its coil.

These and other objects and advantages of the invention can be understood from the following detailed description of several embodiments described in conjunction with the drawings.

BRIEF DESCRIPTION OF THE DRAWINGS

FIG. 2 is a front perspective view of the modified handset of FIG. 1;

FIG. 3 is a rear perspective partially broken away view of the modified handset of FIG. 2;

FIG. 4A is a perspective view of a coil and capacitor used in the coupling device of this invention;

FIG. 4B is a cross-section view of the potted coil used in the invention;

FIG. 5 is a perspective view of the coil used in the coupler of this invention;

FIG. 6A is a schematic presentation of the circuit components used in the coupling device of this invention;

FIG. 6B is a schematic presentation of circuit components used in a coupling device of this invention but without the use of a capacitor;

FIG. 7 is a perspective view of the magnetic coil winding used in the coupling device of the invention;

FIG. 8 is a side view in elevation of a coil of this invention and its interconnection with the speaker in the receiver portion of a handset;

DETAILED DESCRIPTION OF THE DRAWINGS

Figure 1:
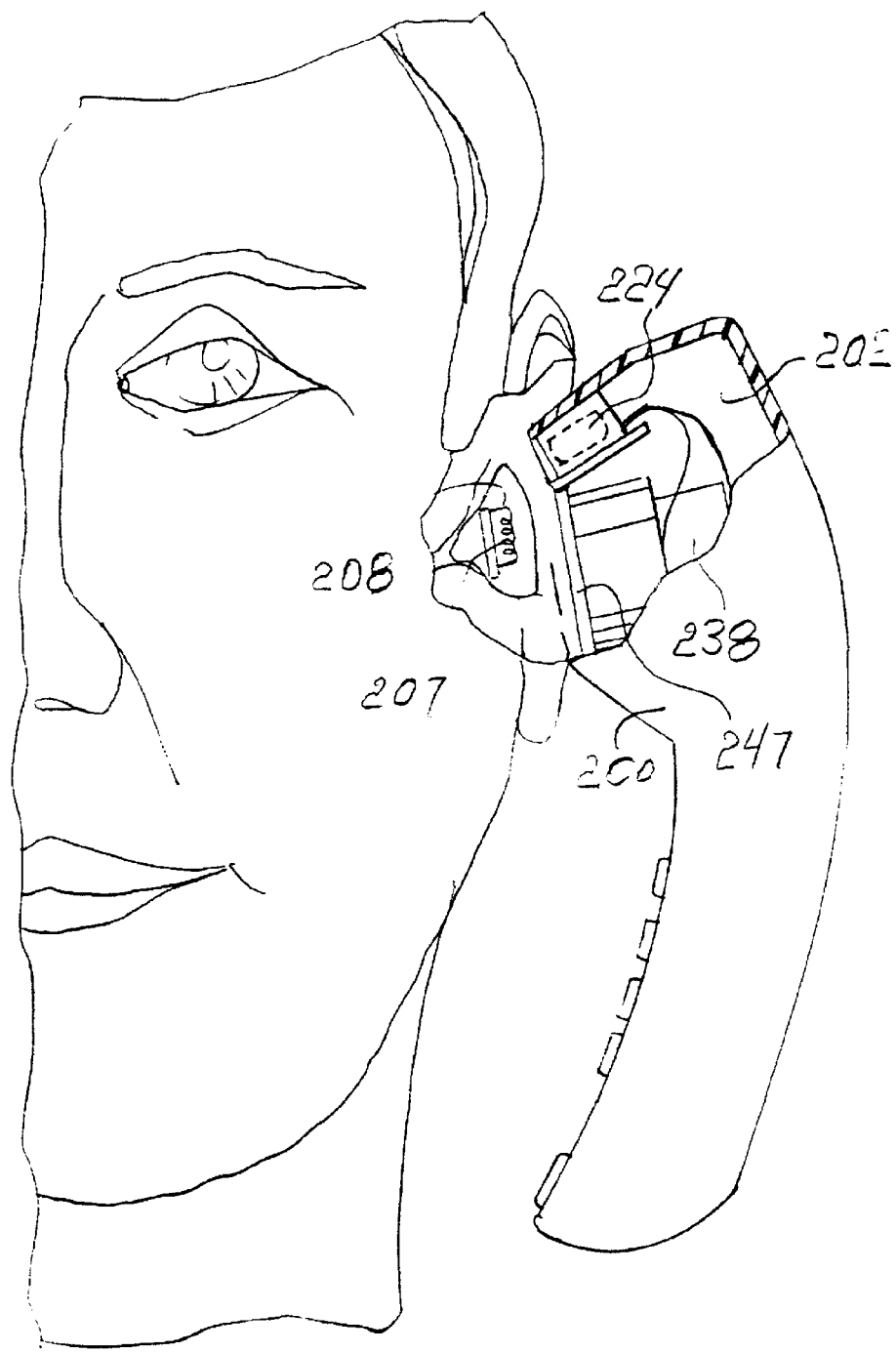
FIG. 1 is a side, partially broken away, view in elevation of a standard telephone whose handset has been modified in accordance with the invention to enable direct communication with a coil inside a hearing aid worn by a person.

With reference to FIGS. 1–8 a conventional telephone handset 200 is shown wherein the receiver section 202 has been modified in accordance with the invention to provide a hearing aid coupler 204 that enables a direct inductive coupling of audio signals from the telephone lines 206 into the T-coil 207 of the hearing aid 208. The hearing aid coupler 204 is formed of a coil 232 and a capacitor 234 that are connected in series with the coil 236 of the speaker 238 in the telephone handset 200. The circuit of the coupler 204 is as illustrated in FIG. 6A.

The telephone handset 200 can be a standard telephone as is illustrated or a cell phone or other types of phones, or a hands-free headset or earphone, or a multi-media headset. The handset can be used for a multiple of purposes such as a enable an impaired hearing person to listen to a CD player or an audio output from a computer or other device. Accordingly, the term handset includes anyone of these well-known devices that can be modified with a circuit in accordance with the invention or made originally to include a circuit in accordance with the invention.

The capacitor 234 is of the miniature type so that it is very small and can fit inside the central hole 240 of the toiroidal coil 232. The coil 232 and capacitor 234 are potted with a potting compound 242 to form a cylindrical structure that is placed inside a receptacle 244 adjacent the front surface 246 of the front wall 247 of the receiver section 222 to provide more efficient inductive coupling with the coil 227 of the hearing aid 228. Alternatively the receptacle can be dispensed with and the coupler 224 glued into place inside the receiver section 222 and adjacent the front surface 246.

The capacitor 234 is provided to avoid additional DC current load on the circuitry driving the speaker 238 and provide a Butterworth filter effect that avoids coupling of low audio frequencies below about 300–350 Hz. The capacitor 234, however, is not always needed and can be dispensed with, as shown in the circuit of FIG. 6B, when sufficient electrical driving power is available.

In one example for a coupler 224 in accordance with the invention, the coil 232 has an inductance of about 4.8 milli-henries, the capacitor is about 2.3 microfarads so as to yield a bandpass filter that cuts of frequencies below about 300 Hz and above about 10K Hz. The coil can be made of 220 turns of 38 gauge rectangular wire yielding a resistance of about 5 ohms.

FIGS. 3 and 8 illustrate the electrical connections from the standard telephone circuit board 250 out put leads 226 to the speaker coil 236 and the coupler coil 224. The impedance of the speaker coil 236 is typically in the range of 12 to 30 ohms so that the addition of about a 5 ohm coupler circuit 224 does not impose a significant additional load.

With reference to FIGS. 9 through 13 an alternate embodiment is illustrated. In FIG. 9A a carrier disc 12 and its associated parts, a flange 20 of front wall 247 of the receiver section of the handset, spokes 14, mounting studs 18, a core cup 10 and a channel 16 are created from injection molded nylon in a uniform one piece unit. The carrier disc 12 has three spokes 14 added to give the structure lateral rigidity. A channel 16 is added to serve as a means to contain the magnetic core 8, wire leads 32 and the printed circuit board 22. The channel 16 and the spokes 14 are arranged in a 90-degree quadrant to allow the sound from the telephone handset speaker to pass freely through the present invention. The magnetic core 8 and the printed circuit board 22 are secured to the carrier disc 12 by means of mounting studs 18.

Figure 9A:
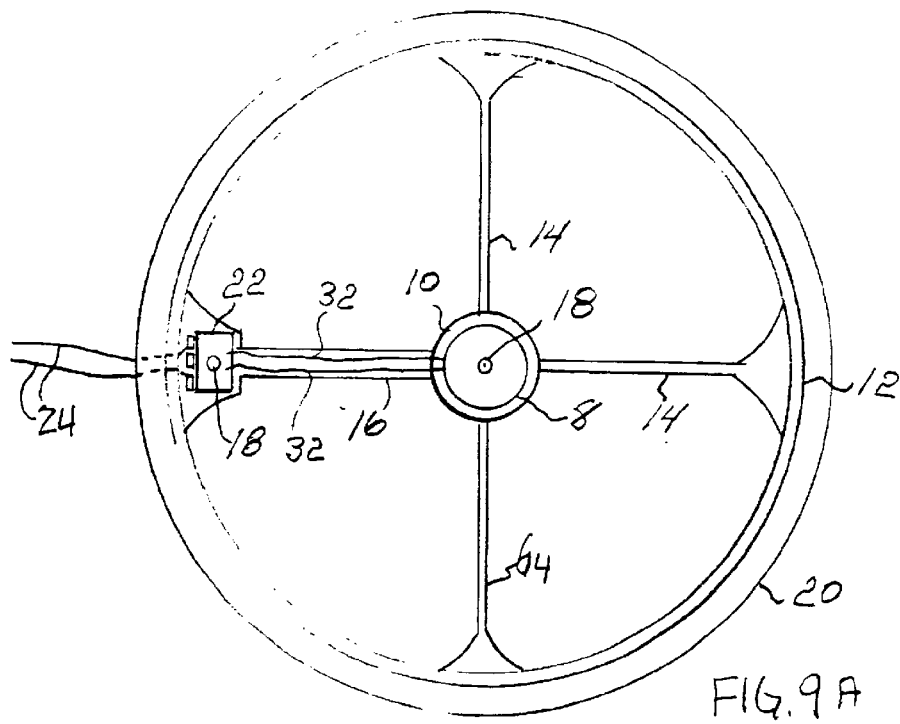
FIG. 9A is a top view of another embodiment of the present invention.
Figure 9B:
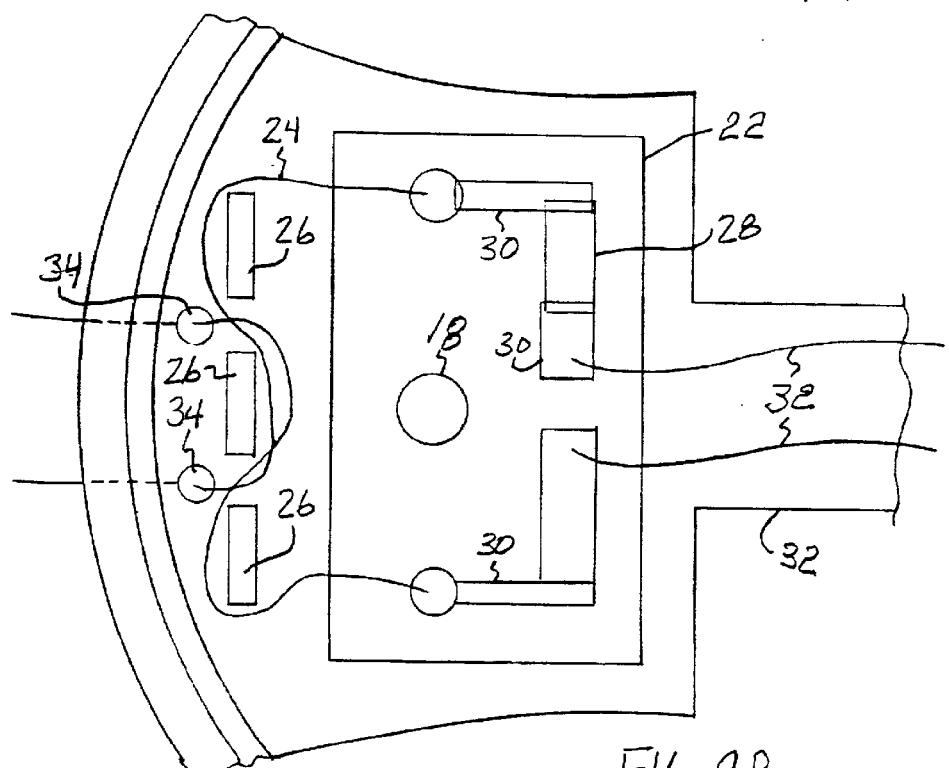
FIG. 9B is a top view of a printed circuit board and surrounding structures for use in the invention of FIG. 9A.

FIG. 9B details the printed circuit board 22 and the surrounding structures. The printed circuit board 22 is held in place by the mounting studs 18. It contains printed circuit traces 30, and a 1 micro-farad surface mount electrolytic capacitor 28. The wire leads 32 from the magnetic core 8 are soldered to the printed circuit traces 40. The service leads 24 that will attach to the telephone handset speaker terminals 46 are soldered to the printed circuit traces 30. The other end of the service leads 24 are now wrapped around the strain reliefs 26, and finally exit the carrier disc 12 via exit holes 34.

Figure 9C:
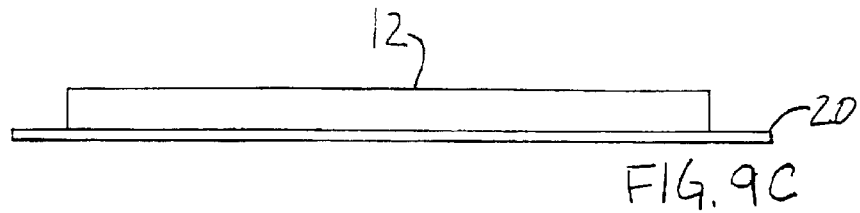
FIG. 9C is a side view of the embodiment of FIG. 9A.

FIG. 9C illustrates a side view of the carrier disc 12 with the mounting flange 20. The mounting flange 20 allows a means of installing the present invention into a telephone handset 44.

Figure 10A:
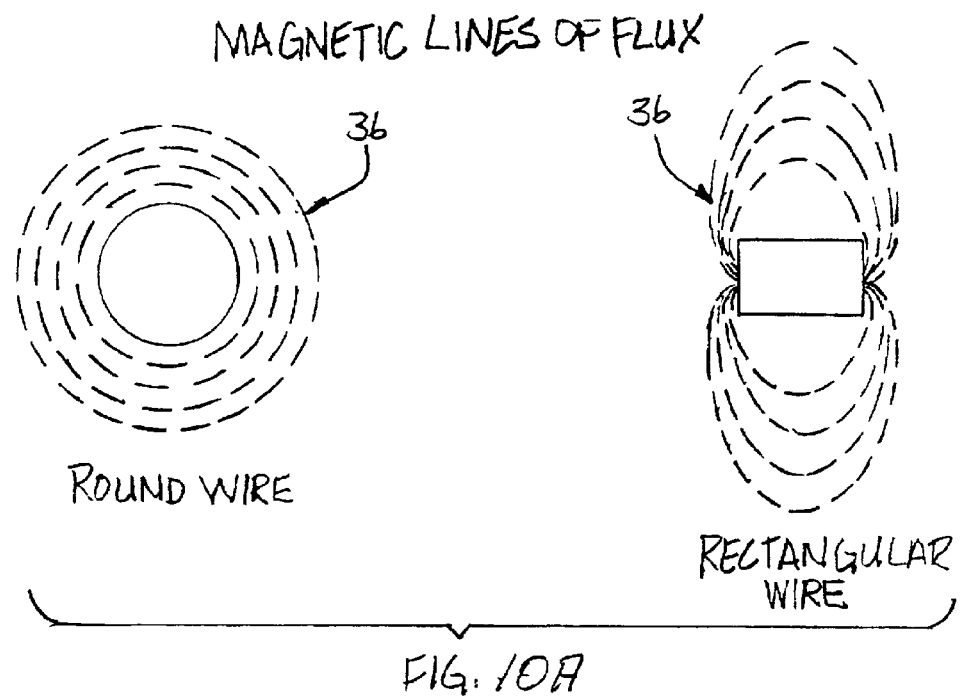
FIG. 10A is an end on view of typical magnetic flux fields around round and rectangular wires.

FIG. 10A details the magnetic lines of force that surround both round and rectangular wire. As can be seen, round wire tends to propagate the magnetic field 36 uniformly, around its 360 degree radius. However, in the case of using a wire with a rectangular cross section, the magnetic field will tend to generate the lines of flux along the widest span of the wire. The field's maximum will generally be at 90 degrees and 180 degrees relative to the longest length of the wire, and will continue along its entire length.

Figure 10B:
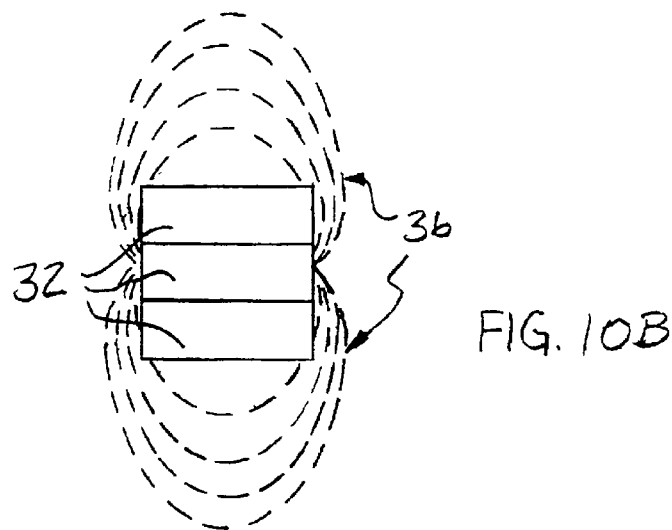
FIG. 10B is a typical magnetic flux field with several layers of rectangular wires layered upon each other.

FIG. 10B details what is achieved when rectangular coil wire 32 is wound layer by layer upon itself. The magnetic lines of force will now concentrate in a vertical polarity as additional layers are added. Thus, the maximum electromagnetic force will be concentrated along the top and bottom of the coil windings as it is wound around the magnetic core 8.

Figure 10C:
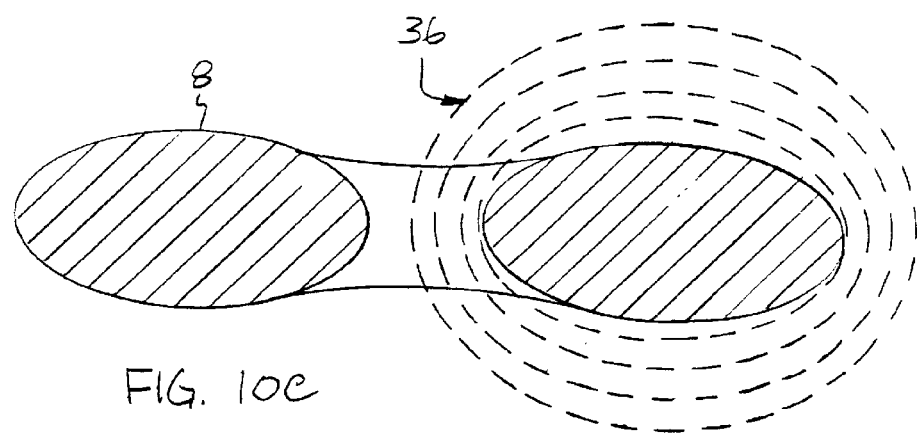
FIG. 10C is a side view in cross-section illustrating the magnetic field around the magnetic core of a coil used in accordance with the invention.
Figure 15:
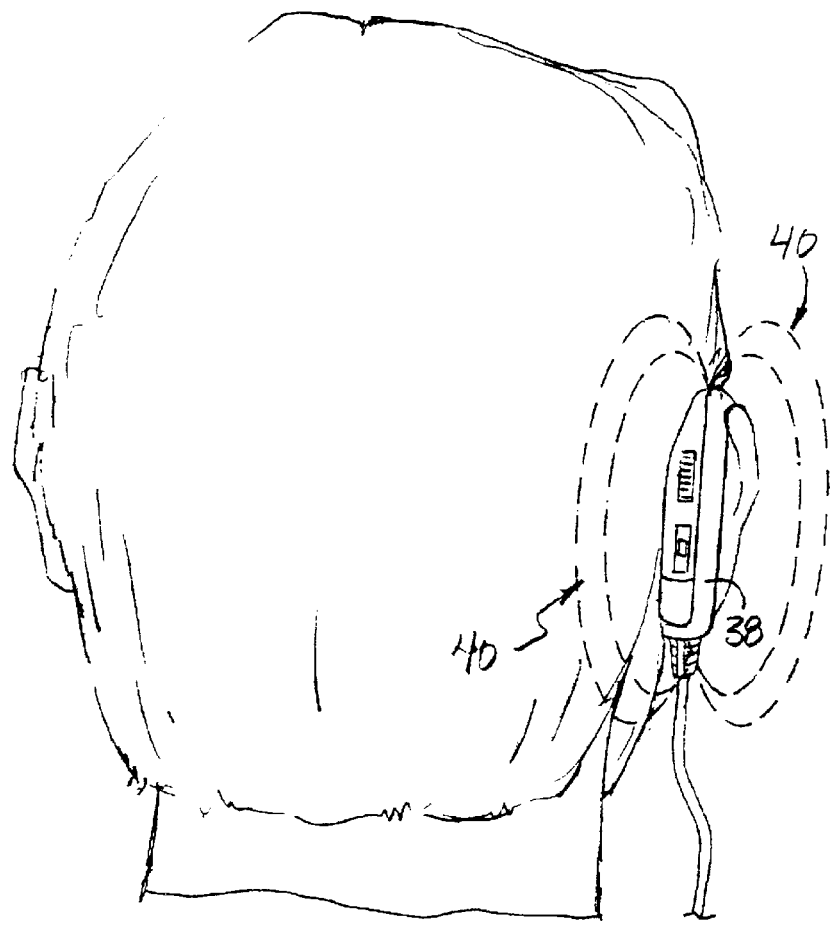
FIGS. 14 and 15 are respectively side and rear views of a prior art hearing aid coupler as shown in U.S. Pat. No. 5,796,821.
Figure 14:
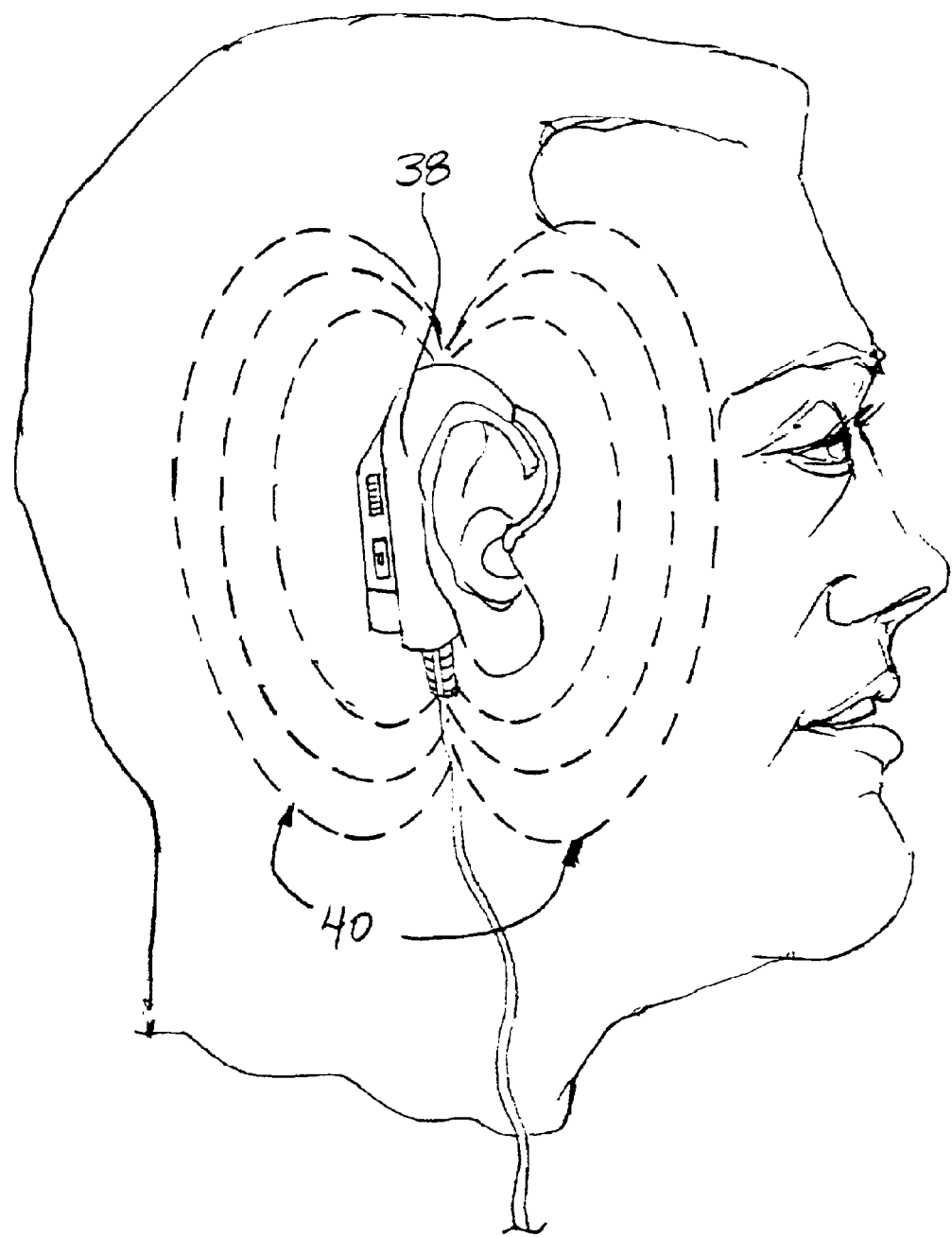

FIG. 10C shows the effect of using the rectangular coil wire 32 when it is wound around the magnetic core 8. Due to the elliptical cross section of the magnetic core 8, the magnetic lines of force 36 will build upon themselves and radiate in an elliptical fashion, going 90 and 180 degrees to the longitudinal plane of the magnetic core 8. Thus, the magnetic lines of force 36 are now able to be directed at the users hearing aid when the magnetic core is used in a vertical fashion, and with very little magnetic propagation being wasted by projecting this energy to the front, top, and rear as in prior invention as shown at 40 in FIGS. 14 and 15.

Figure 11:
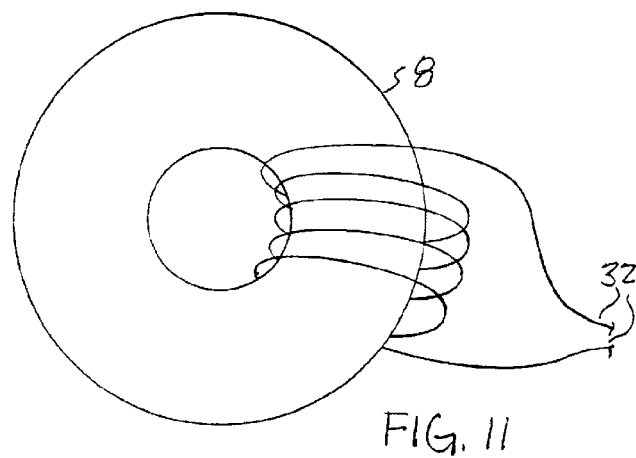
FIG. 11 is a plan view illustrating a typical method of winding the magnetic core of the coil of FIG. 10C.

FIG. 11 shows the method of winding the magnetic core 8 with rectangular coil wire 32. The magnetic core 8 is wrapped with 40-gauge, an exemplary value, rectangular coil wire 32. The winding is in a circular counterclockwise fashion, for a total of approximately 200 windings, leaving 4 inches of wire extending from the magnetic core 8 for soldering to the printed circuit board 22. It should be understood that round or other types of wires also work and that the number of turns can vary.

Figure 12:
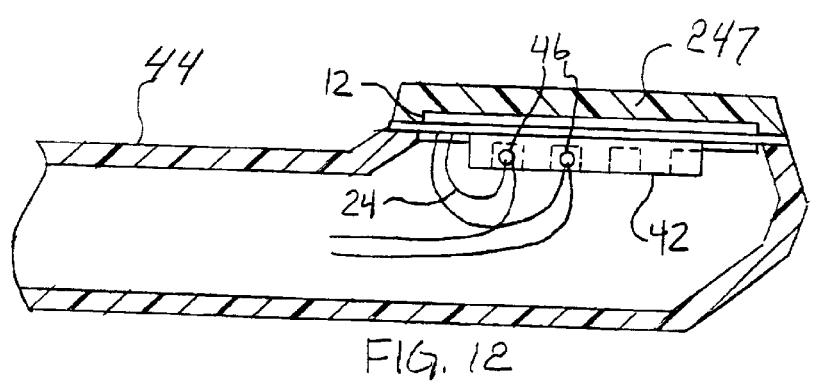
FIG. 12 is a partial side section view of a telephone handset installation of a hearing coupler in accordance with the invention.

FIG. 12 depicts a typical installation into a telephone handset 44. The completed carrier disc 12 is installed by laying the carrier disc 12 directly on top of the telephone handset speaker 42. The service leads 24 are now soldered or terminated in another fashion to the telephone handset speaker terminals 46.

Figure 13:
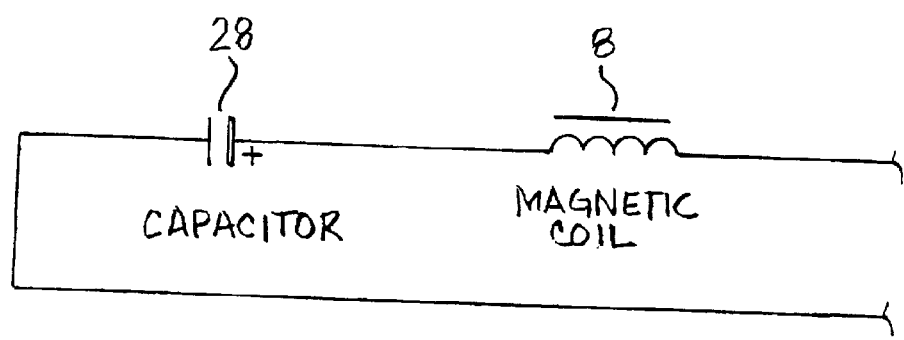
FIG. 13 is a schematic of the circuit used in the hearing aid coupler of this invention.

FIG. 13 is similar to FIG. 6A and represents one electrical schematic of the invention. Capacitor 28 is a 1 microfarad 50 volt surface mount tantalum capacitor and is connected in series with the winding around magnetic core 8. The terminals are connected to the handset speaker as described above. The value of the capacitor may vary and as shown in connection with the embodiment of FIGS. 1–8 can be of the order of 2.2 microfarads or higher depending upon what value yield optimum coupling and effectiveness in transferring audio to the haring aid's T-coil.

After the assembly of the present invention, the entire product is coated or encapsulated in an epoxy material to provide both shock, moisture and tamper proof protection.

With a coupler device in accordance with the invention an effective coupling between a handset and the coil of a hearing aid is obtained. The effectiveness of the coupling is enhanced with a specially shaped magnetic toiroidal coil that employs a core of ferrite material that is composed of high purity oxides of manganese, zinc and iron. This material adds to the magnetic flux created by the coil windings. It is also formed into an elliptical shape that assists in concentrating the magnetic liens of flux towards the user's T-coil equipped hearing aid. The coil is then attached to a plastic carrier disc for installation into a telephone handset. By including a series capacitor a further coupling enhancement is obtained.

With a core of the described type an aiming of the omni-directional magnetic field can to some extent be achieved to enhance coupling to the T-coil of the hearing aid. As a result the hearing aid is less likely to drop a signal input from the telephone coil and dead spots in a communication are reduced.

The use of capacitor 28 brings current and voltage of the input audio signal back into phase with each other. This and the blockage of DC current assist in reducing power demands. The magnetic flux surrounding the core tends to store energy and thus is believed to contribute to performance of the coupling circuit. The relatively low electrical resistance of the coil winding, typically in the range from about 5 to 9 ohms, enables the device to be powered by the electrical telephone circuit. The small size of the coupler device, typically about a ¼ of an inch in diameter, and with a thickness of about $\frac{1}{8}^{th}$ to about a ¼ of an inch for the bare coil, facilitates its incorporation within the receiver section of a handset.

When a handset with a coupler device in accordance with the invention is in operation, the electromagnetic signal from the coupler device is easily picked up by the T-coil of the hearing aid for final amplification and acoustic delivery to the hearing impaired user.

Although the preferred form of the invention uses a ferromagnetic core, it is to be understood that an open air coil, when placed adjacent the front wall of the receiver section of a handset, may be able to provide audio communication with a hearing impaired person.

Although the present invention has been described in considerable detail with reference to certain preferred version thereof, other version are possible, For example, present wafer designs enable and thus benefit from the coupling of the coil. The present invention can be easily implemented with many wired as well as wire-less communication devices such as desk, residential, office-key systems, pay phones, cordless phones, pps systems, emergency phones, radio/alarm and cd/cassette systems, ear phones systems, headset systems, telemarketing phone systems, interactive communication systems, fun design phones, sound ear-jack systems, recording-television studio headsets, CB radios, tour headset systems and airplane, bus, and rail headsets.

Therefore, the spirit and scope of the appended claims should not be limited to the description of the preferred embodiments. Unless expressly stated otherwise, all features disclosed in this specification, including any accompanying claims, abstract and drawings, may be replaced by alternate features serving the same, equivalent or similar purpose. Thus, each feature is one example of a generic series of equivalent or similar features.

What is claimed is:

1. A coupler device for coupling an audio signal within a handset to a hearing aid having a T-coil for receiving inductively transmitted audio, comprising:
   a coil wound around a magnetic core and a capacitor coupled together in series, said capacitor and coil being coupled to a speaker in the handset and physically mounted within said handset.

2. The coupler device as claimed in claim 1, wherein said series connected capacitor and coil are connected in series with said speaker.

3. A coupler device for a handset comprising:
   a coil and a coil core around which the coil is wound, said coil and coil core being formed to mount inside a receiver section of a handset for connection to a speaker so as to provide an inductive field that can be coupled through the handset to a coil inside a hearing aid;
   a capacitor connected in series with said coil;
   said coil, coil core and capacitor being encapsulated within a material selected to enable an inductive field generated by the coil at audio frequencies to pass there-through.

4. A coupler device for a telephone handset comprising:

a telephone handset, signal receiving means having an output, an audio speaker having a coil disposed within the handset and electrically connected to the output of the signal receiving means, inductive means electrically connected with the audio speaker coil for producing an electromagnetic field responsive to the output of the signal receiving means that may be inductively coupled to a second inductive means outside of the telephone handset, and capacitive means connected in series with the inductive means.

5. A coupler device for a telephone handset comprising:

a telephone handset, signal receiving means having an output, an audio speaker having a coil disposed within the handset and electrically connected to the output of the signal receiving means, inductive means connected in series with the audio speaker coil for producing an electromagnetic field responsive to the output of the signal receiving means that may be inductively coupled to a second inductive means outside of the telephone handset, and a capacitor in series connection with said inductive means, said capacitor and inductive means forming a filter for enhanced inductive coupling with said coil of the hearing aid.

6. A signal coupler for inductively coupling audio signals present on leads in a telephone receiver to an inductive coil in a hearing aid that is proximately disposed to the telephone receiver comprising:

a telephone handset having a receiver section, including a speaker coil responsive to audio signals on the leads, and a coupler coil connected in electrical series with the speaker coil and disposed inside the receiver section to generate an electromagnetic field in response to said audio signals, said electromagnetic field being inductively coupled to the inductive coil inside the hearing aid to enhance communication with a hearing impaired listener who uses the hearing aid, and a capacitor in series connection with said coupler coil, said capacitor and coupler coil forming a filter for enhanced inductive coupling of audio signals from said leads to said hearing aid coil.

7. The coupler device as claimed in claim 6 wherein the capacitor and coupler coil form a filter that excludes low and high audio frequencies.

8. The coupler device as claimed in claim 5 wherein said core is formed of a ferrite material.

9. The coupler device as claimed in claim 8 wherein said core is a toroid.

10. The coupler device as claimed in claim 8 wherein said core is formed of a ferromagnetic material.

* * * * *